Sept. 13, 1955  W. F. PANSING ET AL  2,717,694
ELUTRIATION OF FINES FROM POWDERED SOLIDS
HAVING AGGLOMERATING TENDENCIES
Filed May 26, 1954

William F. Pansing
Alvin William Ries
INVENTORS.

BY Donald E. Payne

ATTORNEY

United States Patent Office 2,717,694
Patented Sept. 13, 1955

2,717,694

ELUTRIATION OF FINES FROM POWDERED SOLIDS HAVING AGGLOMERATING TENDENCIES

William F. Pansing and Alvin William Ries, Highland, Ind., assignors to Standard Oil Company, Chicago, Ill., a corporation of Indiana Application May 26, 1954, Serial No. 432,442

5 Claims. (Cl. 209—138)

This invention relates to the classification of powdered solids by elutriation and it pertains more particularly to the removal of fines from fluidized solids having agglomerating tendencies.

It is known that for dry elutriation of fluidized solids complete dispersion of the particles must be accomplished and in the Roller particle-size analyzer, for example, an air jet has been employed to insure such dispersion of the entering charge. We have found, however, that certain fluidized solids have agglomerating tendencies which cause the fines to reagglomerate or adhere to coarse particles in the fluidized bed of the elutriation system even though such particles were completely dispersed at their point of introduction. This agglomerating tendency has been encountered with hydroforming catalysts of both the platinum-on-alumina type and the molybdena-on-alumina type. The fines in such powdered catalyst compositions have such a strong tendency to agglomerate at ordinary temperatures of about 60 to 100° F. that previously known methods of air elutriation are not effective for removing them from coarser particles. It is not known whether the agglomerating tendency is due to electrostatic force or to even stronger molecular type forces. The agglomerates which are formed in the fluidized bed itself behave like large particles and hence are not removed from a fluidized bed in conventional elutriators. An object of our invention is to provide an improved method and means for elutriating fines from fluidized beds containing such agglomerates. A further object is to provide an improved elutriation system. Other objects will become apparent as the detailed description of the invention proceeds.

We have discovered that remarkably improved elutriation of fines from a fluidized bed of solids may be obtained by injecting a portion of the elutriating gas at a velocity of about 20 to 200, e. g. about 50 feet per second against catalyst particles at the interface of the dense fluidized solids phase. Thus when air is the elutriating gas a portion thereof is injected in the form of one or more jets within a few inches of the dense phase interface at a velocity in the range of about 50 to 200 feet per second which is sufficiently high to break up agglomerated particles without causing any appreciable solids attrition. If sufficient settling space is provided above the dense phase the jets may be directed upwardly at a level about 1 to 5 inches below the solids interface. To minimize carry-over and occlusion of large particles in the dilute phase the jets are preferably directed downwardly from a level immediately above the dense phase interface. When the elutriation is effected in a cylindrical vessel it is advantageous to direct the jets laterally to impart a centrifugal effect which tends to cause a lateral segregation of coarse from fine particles which supplements and augments the elutriation of fines by that portion of the elutriating gas which in all cases is introduced at the base of the elutriating vessel.

The invention will be more clearly understood from the following detailed description of specific examples read in conjunction with the accompanying drawings which form a part of this specification in which.

While the invention is applicable to elutriation of any finely divided or powdered solids which agglomerate under the conditions of the desired elutriation, it will be described as applied to the elutriation of catalyst fines in a fluidized bed of platinum-on-alumina catalyst. The particle size distribution of catalyst particles is of considerable importance for obtaining proper fluidization and when a batch of catalyst contains an excessive amount of fines, it is necessary that they be removed by elutriation. The fine catalyst particles, i. e. those of about 0 to 30 micron particle size, at ordinary temperatures and pressures, have a marked tendency to agglomerate when fluidized by the passage of air or other gas upwardly therethrough under fluidizing conditions. The agglomerated particles behave like larger particles and the agglomeration thus prevents the desired removal of fine particles from the bed.

With some solids dispersion of electrostatic charges may be effected by the use of humidified elutriating gas, high temperatures, or addition of gaseous ammonia to the elutriating gas. With the fluidized mass of platinum-on-alumina catalyst these techniques were ineffective, the use of ammonia being further objectionable because of its deactivating effect on the catalyst. We have found, however, that by impinging jets of air or other gas on catalyst particles at or adjacent the dense phase interface at a velocity in the range of about 20 to 200 feet per second and preferably at about 50 feet per second,, the agglomerates may be readily broken, i. e. the fine particles disengaged from other particles, without appreciable attrition of the solid particles. It is essential that the jets be adjacent the interface of the fluidized bed so that fine particles can be immediately carried into the dilute phase by the upflowing gases because if such jets are employed in the lower part of the fluidized bed, the particles again coalesce before reaching the interface.

Figure 1:
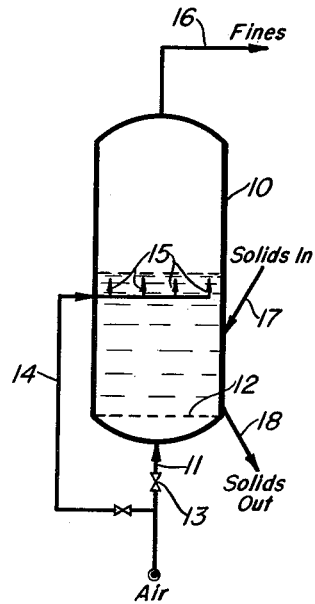
Figure 1 is an elevation of a system employing upflow jets.

Referring to Figure 1, a mass of fluidized platinum-on-alumina catalyst particles ranging from about 1 to 100 microns in particle size and containing an excess of fines is fluidized in cylindrical vessel 10 by air introduced through line 11 and distributed by distributor 12, the amount of air being controlled by valve 13 to give an upward air velocity in the elutriator chamber of about .1 foot per second or more. Continued operation of the elutriator in this manner was ineffective for removing an appreciable amount of the excess fines because of the tenacity with which these fines agglomerated. However, by by-passing a part of the introduced air through line 14 and impinging it against the top of the bed by spaced jets 15 uniformly spaced about 1 to 3 inches below the dense phase interface, the agglomerates were readily broken and the fines removed from the system through line 16 when employing a velocity in jets 15 of about 50 feet per second. For continuous operation solids may be continuously introduced into the dense phase by line 17 and continuously removed therefrom by line 18. Any desired amount of fines can thus be removed from the solids by controlling the residence time of the introduced solids in the elutriator.

Figure 2:
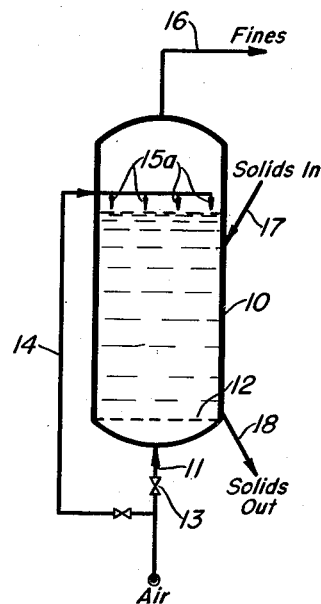
Figure 2 is an elevation of a system employing downward jets.

The system in Figure 2 is similar to that described in Figure 1 except that distributor jets 15a are directed downwardly against the dense phase interface; in this system there is less likelihood for entrainment of larger particles and less disengaging space is, therefore, required above the dense phase level.

Figure 3:
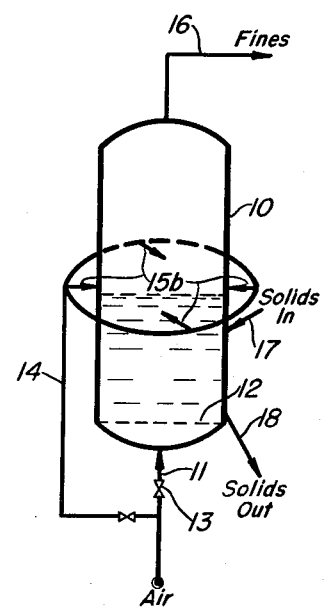
Figure 3 is an elevation of a system employing lateral jets.

In Figure 3 the jets 15b are directed laterally and tengentially just below the dense phase interface to provide not only the breaking up of agglomerates but also a centrifugal action which tends to throw the coarser particles toward the periphery of the vessel; the coarser particles tend to flow downwardly through the periphery of the vessel and upwardly through the central part thereof thereby expediting the elutriation of fines from the interface.

Figure 4:
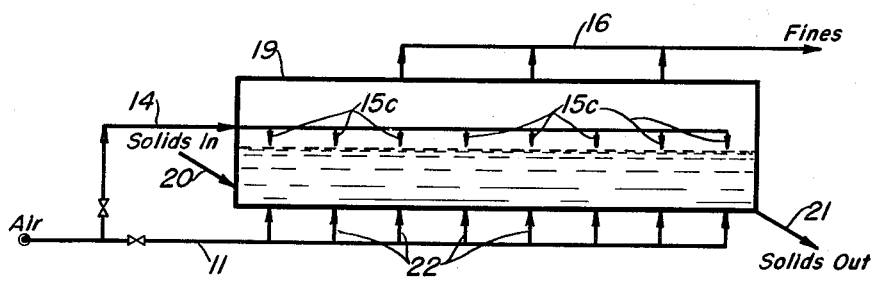
Figure 4 is an elevation of a longitudinal system employing downwardly directed jets.

In Figure 4 a horizontal elutriator vessel 19 is employed, the fluidized solids being introduced at one end through line 20 and withdrawn from the other through line 21. The solids are maintained in dense phase fluidized condition by air introduced through a plurality of spaced inlets 22 or by employing porous diffuser plates in the base of the elutriator vessel. The agglomerates are broken at the fluidized bed interface by downwardly and laterally directed spaced jets 15c, the fines being withdrawn from the upper part of the vessel through line 16.

In all cases the amount of gas supplied at the base of the fluidized bed through the distributor is adjusted so that the superficial gas velocity upwardly through the bed will be equivalent to the settling velocity of the largest particles that are to be removed from the catalyst. Generally speaking, relatively shallow bed depths are preferable, i. e. the beds are preferably not deeper than about 1 to 3 feet. The superficial velocities required for removing particles of various size are known to those skilled in the art (i. e. conventional Roller analysis technique; also note Chem. Eng. Prog., 47, pages 39–45, January 1951, and Chem. Eng. Prog. 47, pages 566–570, November 1951).

While the invention has been described in connection with specific examples, other modifications and applications of the invention will be apparent from the above description to those skilled in the art.

We claim:
1. The method of elutriating fines from a fluidized mass of powdered solids which have a tendency toward agglomeration, which method comprises introducing a portion of the elutriating gas at the base of said fluidized mass in an amount sufficient to maintain said mass in fluidized condition, to provide a superficial upward gas velocity in said mass substantially equivalent to the settling velocity of the largest particles to be removed, and to provide a dense phase interface and injecting another portion of the elutriating gas at at least one point adjacent said interface at a velocity sufficient to break up agglomerates but insufficient to effect appreciable attrition.

2. The method of claim 1 wherein the elutriating gas introduced adjacent the interface is introduced at a velocity in the range of about 20 to 200 feet per second.

3. The method of claim 2 wherein the portion of elutriating gas introduced adjacent the interface in introduced at a distance less than about 6 inches from said interface.

4. The method of claim 1 wherein the gas introduced adjacent said interface is introduced in a downward direction.

5. The method of claim 1 wherein the gas introduced adjacent said interface is in a lateral direction.

References Cited in the file of this patent
UNITED STATES PATENTS

| | | |
|---|---|---|
| 2,364,145 | Huppke et al. | Dec. 5, 1944 |
| 2,563,086 | Verschoor | Aug. 7, 1951 |
| 2,586,818 | Harms | Feb. 26, 1952 |
| 2,683,685 | Matheson | July 13, 1954 |

FOREIGN PATENTS

| | | |
|---|---|---|
| 600,326 | Great Britain | Apr. 6, 1948 |